United States Patent [19]

Adam

[11] Patent Number: 4,598,155

[45] Date of Patent: Jul. 1, 1986

[54] 3(5-TETRAZOLYL)1,4-DIAMINOAN-THRAQUINONES

[75] Inventor: Jean-Marie Adam, Rosenau, France

[73] Assignee: Ciba-Geigy Corporation, Ardsley, N.Y.

[21] Appl. No.: 441,829

[22] Filed: Nov. 15, 1982

[30] Foreign Application Priority Data

Nov. 18, 1981 [CH] Switzerland ............. 7410/81

[51] Int. Cl.[4] ........................... C07D 257/04
[52] U.S. Cl. ........................... 548/253; 260/378
[58] Field of Search ........ 548/253; 260/377, 378, 260/365, 369

[56] References Cited

U.S. PATENT DOCUMENTS

| | | | |
|---|---|---|---|
| 2,496,414 | 2/1950 | Seymour et al. | 260/380 |
| 2,640,059 | 5/1953 | Salvin et al. | 260/378 |
| 2,898,343 | 8/1959 | Klingsberg | 260/377 |
| 3,984,429 | 10/1976 | Peel et al. | 548/253 |
| 3,984,534 | 10/1976 | Peel et al. | 424/45 |
| 4,042,605 | 8/1977 | Hartwig | 260/369 |
| 4,294,769 | 10/1981 | Krock et al. | 260/378 |
| 4,299,771 | 11/1981 | Takeshita et al. | 260/378 |

FOREIGN PATENT DOCUMENTS

| | | | |
|---|---|---|---|
| 0116376 | 10/1978 | Japan . | |
| 1452891 | 10/1976 | United Kingdom | 548/253 |

OTHER PUBLICATIONS

Hackh's Chemical Dictionary, McGraw-Hill Book Co., 4rth Edition, Julius Grant, p. 16.
Chemical Abstract, vol. 83, (1975), 81110z.
Venkataraman, The Chem. of Synthetic Dyes, vol. II, pp. 807–812, pp. 858–860, pp. 883–887, Academic Press, N.Y., N.Y. (1952).

*Primary Examiner*—Glennon H. Hollrah
*Assistant Examiner*—D. Springer
*Attorney, Agent, or Firm*—Edward McC. Roberts; Kevin T. Mansfield

[57] ABSTRACT

There are described novel compounds of the formula I

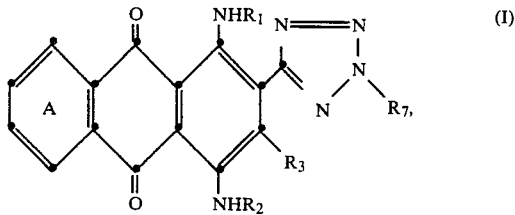

wherein the symbols $R_1$, $R_2$, $R_3$, $R_7$ and A have the meanings defined in claim 1, also processes for producing them and their use as dyes for dyeing and printing textile materials, on which are obtained brilliant, deeply colored, blue dyes, particularly on polyester materials.

7 Claims, No Drawings

3(5-TETRAZOLYL)1,4-DIAMINOANTHRAQUINONES

The invention relates to novel 1,4-diaminoanthraquinone compounds, to processes for producing them, to their use as dyes for dyeing and printing textile materials, and to novel intermediates.

The novel 1,4-diaminoanthraquinone compounds correspond to the formula I

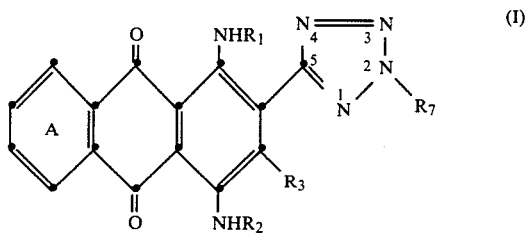

wherein
$R_1$ and $R_2$ independently of one another are each hydrogen, an unsubstituted or substituted $C_1-C_6$-alkyl group, an unsubstituted or substituted $C_5-C_8$-cycloalkyl group, or an unsubstituted or substituted phenyl group;
$R_3$ is hydrogen, cyano or $COOR_4$ or $CON.R_5.R_6$, wherein: $R_4$ is unsubstituted or substituted $C_1-C_{10}$-alkyl or $C_5-C_8$-cycloalkyl, and $R_5$ and $R_6$ independently of one another are each hydrogen or $C_1-C_{10}$-alkyl, or $R_5$ and $R_6$ together with the N atom form a pyrrolidine, piperidine, morpholine or piperazine ring;
$R_7$ is unsubstituted or substituted $C_1-C_{10}$-alkyl or $CO.R_{12}$, in which $R_{12}$ is unsubstituted or substituted $C_1-C_6$-alkyl or phenyl, and wherein the benzo radical A can be substituted; and the invention relates also to the corresponding N isomers and to mixtures of these 1,4-diaminoanthraquinone compounds.

When $R_1$ and/or $R_2$ are (is) an unsubstituted or substituted $C_1-C_6$-alkyl group, this is a straight-chain or branched-chain alkyl group, for example the methyl, ethyl, n- or iso-propyl group, the n-, sec- or tert-butyl group, the n- or iso-pentyl group or the n- or iso-hexyl group. These alkyl groups can be mono- or polysubstituted, for example by OH, $C_1-C_4$-alkoxy and $C_1-C_4$-alkoxy substituted by OH.

Groups of this type are for example: methoxymethyl, ethoxymethyl, ethoxyethyl, ethoxypropyl, n-propoxymethyl, isopropoxymethyl, butoxymethyl, butoxyethyl, butoxypropyl, ethoxypentyl, methoxybutyl, ethoxypentyl and 2-hydroxyethoxypentyl.

When $R_1$ and/or $R_2$ are (is) an unsubstituted or substituted $C_5-C_8$-cycloalkyl group, it is in particular the cyclopentyl or cyclohexyl group; substituents are especially $C_1-C_3$-alkyl groups, particularly the $CH_3$ group.

When $R_1$ and/or $R_2$ are (is) an unsubstituted or substituted phenyl group, possible substituents are for example: $C_1-C_6$-alkyl groups (straight-chain or branched-chain), $C_1-C_6$-alkoxy groups (straight-chain or branched-chain), halogen, such as fluorine, chlorine or bromine, $NO_2$, NHCO-alkyl $C_1-C_6$, COO-alkyl $C_1-C_4$ and COO-alkyl $(C_1-C_4)$—OH.

In the preferred 1,4-diaminoanthraquinone compounds, $R_1$ and $R_2$ are each hydrogen.

When $R_3$ is a $COOR_4$ group, suitable $R_4$ groups are the following: $C_1-C_{10}$-alkyl, both straight-chain and branched-chain, which can be unsubstituted or substituted, for example by OH, phenoxy, alkoxy and hydroxyalkoxy; when $R_4$ is a cycloalkyl group having 5–8 C atoms, it is in particular the cyclopentyl or cyclohexyl group.

When $R_3$ is a $CONR_5.R_6$ group, $R_5$ and $R_6$ can be, interalia, also an alkyl group having 1–10 C atoms: this alkyl group can be straight-chain or branched-chain.

In the preferred 1,4-diaminoanthraquinone compounds, $R_3$ is the CN group.

The benzo radical A can be mono- or polysubstituted; substituents are for example: halogen, such as fluorine, chlorine or bromine, the OH group, a $C_1-C_4$-alkoxy group (straight-chain or branched-chain), such as the methoxy, ethoxy or n- and iso-propoxy group; these alkoxy groups can be further substituted, for example by OH. Further substituents are: a phenoxy group, unsubstituted or substituted by for example $C_1-C_4$-alkyl (straight-chain or branched-chain) or halogen (fluorine, chlorine and bromine); then the $NO_2$ group, the $NH_2$ group, an N-mono- or N,N-dialkylated amino group, the alkyl groups being those having 1 to 4 C atoms, and the NH-phenyl group, which can be unsubstituted or substituted in the phenyl group by $C_1-C_4$-alkyl or $C_1-C_4$-alkoxy or by halogen.

In the preferred 1,4-diaminoanthraquinone compounds, the benzo radical A is not substituted.

If $R_7$ is a $C_1-C_{10}$-alkyl group, this can be straight-chain or branched-chain. It can be for example one of the following groups: methyl, ethyl, n- and iso-propyl, n-, sec- and tert-butyl, n- and iso-octyl and n- and iso-nonyl.

These alkyl groups can be substituted: possible substituents for these alkyl groups are for example: OH, $C_1-C_4$-alkoxy, phenoxy, O-acyl, O-acyl-oxy, $N.R_8.R_9$ and $[N.R_8.R_9.R_{10}]^\oplus An^\ominus$, wherein $R_8$, $R_9$ and $R_{10}$ independently of one another are each $C_1-C_4$-alkyl, unsubstituted or substituted by phenyl, and $An^\ominus$ is an anion customary in cationic dyes. Such anions are for example: organic as well as inorganic ions, for example halogen, such as chloride, bromide or iodide ions, also boron tetrafluoride, rhodanide, sulfate, methyl sulfate, ethyl sulfate, aminosulfonate, perchlorate, carbonate, bicarbonate, phosphate, phosphomolybdate, phosphotungstate, phosphotungstomolybdate, benzenesulfonate, naphthalenesulfonate, 4-chlorobenzenesulfonate, oxalate, maleinate, formiate, acetate, propionate, lactate, succinate, chloroacetate, tartrate, methanesulfonate or benzoate ions, or complex anions, such as that of zinc chloride double salts. The $C_1-C_{10}$-alkyl group $R_7$ can however also be substituted by phenyl, which phenyl group in its turn can be further substituted, for example by $C_1-C_4$-alkyl, by halogen (fluorine, chlorine or bromine), or by $NO_2$; it is for example the benzyl group, the phenethyl group, the p-chlorobenzyl group and p-nitrobenzyl group. Finally, the alkyl group $R_7$ can be further substituted by the —X—$(CH_2)_n$—$R_{11}$ grouping, wherein X is the oxygen or sulfur atom, n is the numbers 1–3, and $R_{11}$ is an aryl group, particularly a phenyl group, which can be further substituted by for example OH, or $R_{11}$ is a heterocyclic ring, which is optionally bound by way of an oxygen atom to the $CH_2$ group. These —X—$(CH_2)_n$—$R_{11}$ groupings are for example:
(2'-phenoxy)-ethoxypropyl,
(furyl-2)-methoxypropyl,
(tetrahydrofuryl-2)-methoxypropyl, (3'-phenyl-(propyloxypropyl),
(phenyl)-methoxypropyl,
(2'-pyridyl-3-oxy)-ethoxypropyl,
(p-chlorophenyl)-methoxypropyl,
(p-methoxyphenyl)-methoxypropyl,
(2'-pyridyl-2)-ethoxypropyl,
(pyridyl-4)-methoxypropyl,
(thienyl-2)-methoxypropyl,
(tetrahydrothienyl-2)-methoxypropyl,
(2'-phenoxy)-ethoxybutyl,
(3'-phenyl)-propyloxybutyl,
(p-chlorophenyl)-methoxybutyl,
(p-methoxyphenyl)-methoxybutyl,
(phenyl)-methoxypentyl,
(phenyl)-methylthiopropyl, and
(2'-phenyl)-ethylthiobutyl.

When $R_7$ is the —$CO.R_{12}$ group, suitable substituents in the $C_1$–$C_6$-alkyl group are for example: unsubstituted phenyl, and phenyl which is substituted for example by $C_1$–$C_4$-alkyl or halogen; in the case of the —$CO.R_{12}$ group, this is for example the methylcarbonyl, ethylcarbonyl, n-propylcarbonyl, benzylcarbonyl or p-chlorobenzylcarbonyl group.

In the preferred 1,4-diaminoanthraquinone compounds, $R_7$ is either unsubstituted $C_1$–$C_4$-alkyl, or $C_1$–$C_4$-alkyl substituted by phenyl.

The invention relates also to the isomers of the 1,4-diaminoanthraquinone compounds of the formula I; mentioned as such are for example compounds wherein the $R_7$ group is in the 1-position of the tetrazole core.

Finally, the invention relates also to mixtures of the 1,4-diaminoanthraquinone compounds according to the invention among each other. Mixtures of this type are composed for example of:

(a) isomers of 1,4-diaminoanthraquinone compounds, wherein the substituent $R_7$ is once in the 1-position and once in the 2-position of the tetrazole ring;

(b) various 1,4-diaminoanthraquinone compounds, wherein $R_7$ is not identical; and (c) mixtures of components (a) and (b) above.

The novel 1,4-diaminoanthraquinone compounds of the formula I are obtained by methods known per se: for example either:

(a) by reacting a compound of the formula II

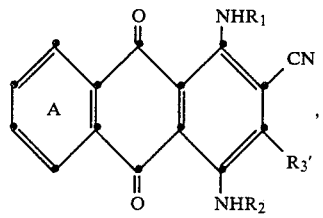

wherein $R_1$ and $R_2$ have the meanings given under the formula I, and $R_3'$ is hydrogen or CN, with an azide in a polar aprotic solvent, optionally in the presence of an ammonium salt, at a temperature of about 70° to 130° C., to give a tetrazole compound of the formula III

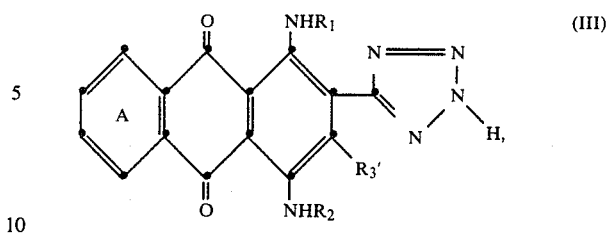

wherein the symbols $R_1$, $R_2$ and $R_3'$ have the given meanings, and subsequently alkylating or acylating this tetrazole compound with a compound introducing the substituent $R_7$, or (b) by performing in a single-vessel process, starting with the compound of the formula II, the ring closure reaction to obtain the tetrazole grouping, and then carrying out alkylation or acylation, without intermediate isolation of the tetrazole compound of the formula III. In the case where $R_3'$ in the formula II is a CN group, it is surprising that in the reaction sequence only one CN group is reacted, namely the one which is least sterically hindered. If the steric hindrance is equally distributed for example by a phenyl group for each of $R_1$ and $R_2$, there is nevertheless only one CN group reacted.

There are obtained by both production methods the 1,4-diaminoanthraquinone compounds of the formula I wherein $R_3$ is hydrogen or CN. The CN group can if desired be saponified, in a known manner, to the COOH group, which can then for example be esterified by way of the carboxylic acid halide, or reacted to the carboxylic acid amide, by which means are obtained the compounds of the formula I wherein $R_3$ is the $COOR_4$ and $CONR_5$—$R_6$ group, respectively.

In the case where the substituent $R_7$ contains a free OH group, this can subsequently be acylated.

To carry out the stated reactions (a) and (b), the azides used are alkali azides, such as potassium azide, and in particular sodium azide, also however ammonium azide. The ammonium salts are for example: ammonium sulfate, ammonium carbonate, ammonium bicarbonate and especially ammonium chloride. Suitable polar aprotic solvents are for example: nitrogen-containing compounds, such as formamide, dimethylformamide, dimethylacetamide, N,N,N',N'-tetramethylurea, N-methylpyrrolidone, 1,5-dimethylpyrrolidone and pyridine; sulfur-containing compounds, such as sulfolane (tetramethylene sulfone) and sulfolene (2,3- and 2,5-dihydrothiophene-S-dioxide), and derivatives thereof substituted in the α- and/or β-position in particular by alkyl or hydroxyalkyl groups, and dimethylsulfoxide; as well as phosphorus-containing compounds, such as hexamethylphosphoric acid triamide and bis-(dimethylamido)-methanephosphate.

The preferred solvent is dimethylformamide. The reaction temperature is between 70° and 130° C., especially 80° C.

When the compounds of the formula I are produced by the single-vessel process according to the variant (b), the procedure in detail comprises adding to the compound of the formula II the azide and solvent, and optionally the ammonium salt, allowing them to react with each other until in the thin-layer chromatogram no more starting material is present, and subsequently adding the compound introducing the $R_7$ group. The compound introducing $R_7$ is either an alkylating agent or an acylating agent.

In the case of an alkylating agent, the halides corresponding to $R_7$, particularly chlorides, are reacted, in the presence of a base, such as alkali (Na, K, Li or NH$_4$) carbonate, alkali bicarbonate, alkali acetate or also alkali hydroxide, in one of the stated polar aprotic solvents, especially dimethylformamide, at a temperature of about 70° to 130° C., preferably at 100° C., with the compounds of the formula III (variant (a)); or these compounds are added to the reaction solution in the single-vessel process (variant (b)). This alkylation can be performed, instead of with the halides corresponding to $R_7$, with the epoxides corresponding to $R_7$. In this case, the reaction temperature is 120° to 135° C., preferably 130° C.

With the use of an acylating agent, that is, in the case where $R_7$ is the —CO—$R_{12}$ group, the procedure is to react the corresponding anhydrides or acid halides, especially acid chlorides, with the compounds of the formula III (variant (a)); or to add these compounds, in the single-vessel process (variant (b)), to the reaction solution. The process is performed here too in the presence of a base and of a solvent, in accordance with the alkylation reaction. The reaction temperature is in this case 20° to 130° C., preferably 50° C.

The time during which the reaction is performed is about 12 to 18 hours, particularly 15 hours, in the case of the isolation of the tetrazole compound of the formula III. When the reaction is performed as a single-vessel process, without isolation of the tetrazole compound of the formula III, the reaction time is about 4 to 7 hours, especially 5 hours.

The starting compounds of the formula II are in part known (for example from the U.S. Pat. No. 1,938,029) for the case where $R_1$ and $R_3'$ in the formula II are each hydrogen; or from the European Patent Application No. 23645 for the case where $R_1=H$, $R_3'=CN$, and $R_2$ is not aromatic.

The compounds of the formula III are novel. The H atom in the tetrazole ring can be both in the 1-position and in the 2-position, or there can also exist a mixture of compounds of the formula III wherein the H atom is once in the 1-position and once in the 2-position.

The novel compounds of the formula II are obtained in particular by a novel production process comprising reacting a compound of the formula IV

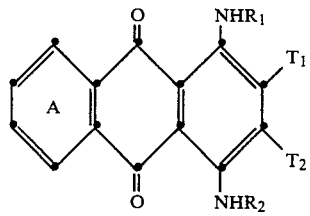

wherein $R_1$ and $R_2$ have the meanings defined under the formula I, $T_1$ and $T_2$ independently of one another are each hydrogen, halogen, SO$_3$H, phenoxy, COOH or COO-alkyl(C$_1$–C$_4$), or one of the two T symbols is CN and the other T has one of the given meanings, with an alkali (Na, K, Li or NH$_4$) cyanide, optionally in the presence of an ammonium salt (for example ammonium chloride, ammonium sulfate, ammonium carbonate or ammonium bicarbonate), in dimethyl sulfoxide at a temperature of about 80° to 120° C., preferably 100° C., and optionally in the presence of an oxidising agent. There is thus obtained the 2,3-dicyano compounds corresponding to the formula II. Suitable oxidising agents are air and oxygen, also inorganic oxidising agents, such as nitrates, manganese dioxide, sodium chlorite, potassium bromate, ammonium persulfate and potassium persulfate, hydrogen peroxide and addition compounds thereof, such as sodium percarbonate, sodium perborate and sodium pyrophosphate, and also organic oxidising agents, for example peroxyacetic acid, the addition compound of urea and hydrogen peroxide, nitrobenzene, m-nitrobenzoic acid and salts thereof, and m-nitrobenzenesulfonic acid and salts thereof. The preferred use is that of nitrobenzene, m-nitrobenzenesulfonic acid and salts thereof, as well as oxygen, advantageously in the form of atmospheric oxygen, optionally in the presence of catalytically acting compounds, such as ammonium molybdate and ammonium vanadate, or copper compounds, for example copper acetate.

It is extraordinarily surprising that the reaction in the solvent to be used according to the invention, namely dimethyl sulfoxide, proceeds so efficiently, since in the other commercially used solvents, for example: water, dimethylformamide, N-methylpyrrolidone, sulfolane, pyridine, ethylene glycol, diethylene glycol, dimethylacetamide and tetramethylurea, the yields with respect to the dicyano compound, under comparable reaction conditions, are considerably lower since the monocyano compound is formed as the main constituent.

The compounds of the formula IV are known.

Further subject matter of the present invention is formed by the novel intermediates from the formulae II and III. These novel intermediates correspond to the formulae V and VI:

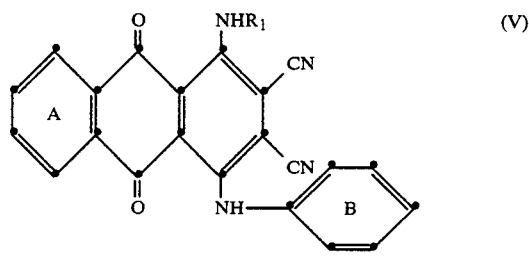

and

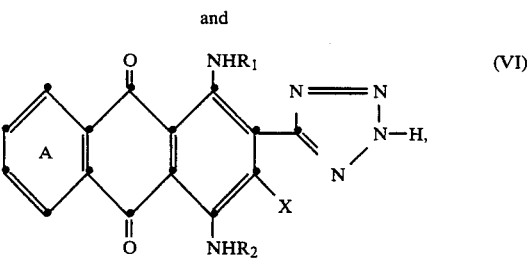

wherein $R_1$ and $R_2$ are as defined under the formula I, whereby the phenyl group B can optionally be substituted in the same way as the phenyl group corresponding to $R_1$ can be substituted, and wherein X is the CN, COOH, COO-alkyl (C$_1$–C$_4$) or CONR$_5$—R$_6$ group.

These novel intermediates V and VI are produced in the manner described from the compound IV.

The novel intermediates of the formula VI as such (optionally as sodium salt) are dyes which can be used for dyeing and printing polyamide materials and wool.

The novel 1,4-diaminoanthraquinone compounds of the formula I are used as dyes for dyeing and printing of in particular textile materials. The novel 1,4-diaminoanthraquinone compounds of the formula I are both disperse dyes, and cationic dyes in the case where $R_7$ is a $C_1$-$C_{10}$-alkyl group which is substituted by a cationic amino group $(N.R_{10}.R_{11}.R_{12})^{\oplus}$.

When the novel 1,4-diaminoanthraquinone compounds are employed as disperse dyes, these dyes are advantageously processed, before their use, into dye preparations. For this purpose they can be ground until their particle size is on average between 0.01 and 10 microns. The grinding can be carried out in the presence of dispersing agents. For example, the dried dye is ground with a dispersing agent, or is kneaded in paste form with a dispersing agent, and subsequently dried in vacuo or by spray drying. The dye preparations thus obtained can, after the addition of water, be used for dyeing, padding or printing either in a long liquor (ratio of goods to liquor greater than 1:5) or in a short liquor (ratio of goods to liquor 1:1 to 1:5).

The novel 1,4-diaminoanthraquinone compounds are excellently absorbed, from an aqueous suspension, onto shaped articles made from fully synthetic or semisynthetic, high-molecular materials. They are particularly suitable for dyeing, padding or printing fibres, filaments or fleeces, fabrics or knitted goods made from linear, aromatic polyesters, as well as from cellulose-2½-acetate and cellulose triacetate. Also synthetic polyamides, polyolefins, acrylonitrile polymerisation products and polyvinyl compounds can be dyed and printed with the novel 1,4-diaminoanthraquinone compounds. Particularly valuable dyeings are obtained on linear aromatic polyesters. These are in general polycondensation products formed from terephthalic acid and glycols, especially ethylene glycol, or polycondensation products from terephthalic acid and 1,4-bis-(hydroxymethyl)-hexahydrobenzene. A further application is the mass dyeing of polyester materials.

The polyester fibres are dyed, by processes known per se, in the presence of carriers at temperatures of between about 80° and 125° C., or in the absence of carriers under pressure at about 100° to 140° C. by the exhaust process. Furthermore, these fibres can be padded or printed with the aqueous dispersions, and the resulting impregnation then fixed at about 140° to 230° C., for example by means of steam, contact heat or hot air. Cellulose-2½-acetate is preferably dyed between about 65° and 85° C., and cellulose triacetate at temperatures up to 115° C.

There are usually added the customary dispersing agents, which are preferably anionic or nonionic, and which can also be used in admixture with each other.

Known anionic dispersing agents suitable for the process are for example: condensation products from naphthalenesulfonic acids and formaldehyde, particularly dinaphthylmethane disulfonate, esters of sulfonated succinic acid, sulfonated castor oil, and alkali salts of sulfuric acid esters of fatty alcohols, for example: sodium lauryl sulfate or sodium cetyl sulfate, sulfite cellulose liquor, or alkali salts thereof, soaps or alkali sulfates of monoglyzerides of fatty acids. Examples of known, particularly suitable, nonionic dispersing agents are addition products of about 3 to 40 mols of ethylene oxide with alkylphenols, fatty alcohols or fatty amines and neutral sulfuric acid esters thereof.

In the case of padding and printing, there are used the customary thickening agents, for example: modified or unmodified natural products, for example alginates, British gum, gum arabic, crystal gum, locust bean flour, tragacanth, carboxymethyl cellulose, hydroxyethyl cellulose, starche or synthetic products, for example polyacrylamides or polyvinyl alcohols.

A further use for the novel 1,4-diaminoanthraquinone compounds of the formula I is in electrooptical displays containing liquid crystals, and also in liquid crystal mixtures containing such dyes.

Where the novel 1,4-diaminoanthraquinone compounds of the formula I are cationic compounds, these are used as dyes for dyeing and, with the addition of binders and solvents, for printing materials dyeable with cationic dyes, especially textile materials, for example those formed from homo- or copolymers of acrylonitrile, or synthetic polyamides or polyesters which are modified by acid groups. In addition, the novel cationic dyes are used also for dyeing wet tow, plastics materials, leather and paper, and also for dyeing polyacrylonitrile in the spinning solution. Dyeing is preferably performed, in an aqueous, neutral or acid, medium, by the exhaust process, optionally under pressure, or by the continuous process. The textile material can be in the widest variety of forms, for example in the form of fibres, filaments, fabrics, knitwear, piece goods and finished articles, such as shirts and pullovers.

The dyeings on textile material which are obtained with the novel disperse dyes and cationic dyes have a neutral to greenish blue shade: they are deeply coloured dyeings having high brilliance and good general fastness properties, especially very good fastness to wet processing, to sublimation and to light; and they have good build-up properties on textile materials; and furthermore they are resistant to acid.

The following Examples further illustrate the invention, without the scope thereof being limited to them. Except where otherwise stated, temperature values are given in degrees Centigrade, and 'parts' are parts by weight.

EXAMPLE 1

29 parts of 1,4-diamino-2,3-dicyanoanthraquinone, 7.2 parts of sodium azide and 5.9 parts of ammonium chloride are stirred in 300 parts of dimethylformamide at 80° C. for 15 hours. The reaction mixture is cooled, diluted with 300 parts of water and acidified with hydrochloric acid. The precipitated reaction product of the formula

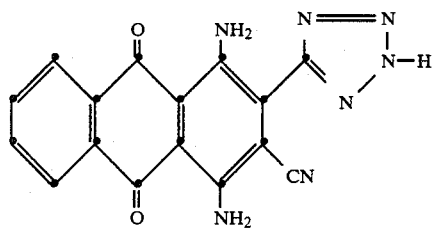

is filtered off with suction, washed neutral with water and dried.

3.3 parts of the product obtained are dissolved with 1.2 parts of sodium carbonate in 30 parts of dimethylformamide; and at 100° C. there are then added 1.5 parts of dimethyl sulfate. The dye of the formula

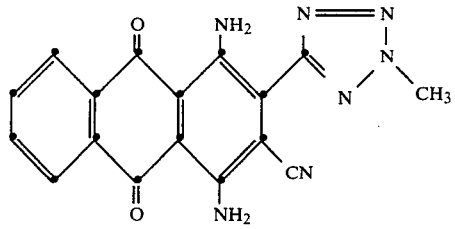

which has crystallised out is filtered off at room temperature, washed with water and dried.

The dye is suitable for dyeing polyester, on which are obtained brilliant clear blue dyeings having excellent fastness properties and high yields.

When in the above Example the 1.5 parts of dimethyl sulfate are replaced by equivalent parts of the alkylating agents listed in the Table 1, column 2, the reaction conditions otherwise being the same, there are obtained similar dyes (column 3) which have equally good properties on polyester materials.

TABLE 1

| 1 Ex. No. | 2 Alkylating agent | 3 $R_9 =$ | | 4 Shade on polyester |
|---|---|---|---|---|
| 2 | diethyl sulfate | $-C_2H_5$ | | blue |
| 3 | benzyl chloride | $-CH_2-\text{C}_6H_5$ | | blue |
| 4 | n-propyl chloride | $-CH_2CH_2CH_3$ | | blue |
| 5 | isopropyl chloride | $-CH(CH_3)_2$ | | blue |
| 6 | n-butyl chloride | $-CH_2CH_2CH_2CH_3$ | | blue |
| 7 | sec-butyl chloride | $-CH(C_2H_5)CH_3$ | | blue |
| 8 | 50% dimethyl sulfate 50% diethyl sulfate | $-CH_3$ $-C_2H_5$ | 50% 50% | blue |
| 9 | 50% dimethyl sulfate 50% benzyl chloride | $-CH_3$ $-CH_2-\text{C}_6H_5$ | 50% 50% | blue |
| 10 | 50% dimethyl sulfate 50% n-butyl chloride | $-CH_3$ $-CH_2CH_2CH_2CH_3$ | 50% 50% | blue |
| 11 | 50% diethyl sulfate 50% n-butyl chloride | $-CH_2CH_3$ $-CH_2CH_2CH_2CH_3$ | 50% 50% | blue |

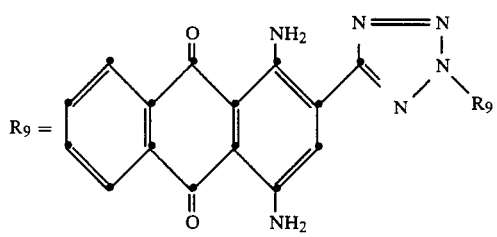

| 1 Ex. No. | 2 Alkylating agent | 3 | | 4 Shade on polyester |
|---|---|---|---|---|
| 12 | 50% diethyl sulfate | $-CH_2CH_3$ | 50% | blue |

TABLE 1-continued

| | 50% benzyl chloride | 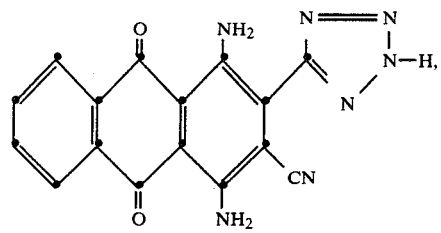 | 50% | |
| --- | --- | --- | --- | --- |
| 13 | 50% n-butyl chloride | —CH$_2$CH$_2$CH$_2$CH$_3$ | 50% | blue |
| | 50% benzyl chloride | | 50% | |

EXAMPLE 14

29 parts of 1,4-diamino-2,3-dicyanoanthraquinone, 7.2 parts of sodium azide and 5.9 parts of ammonium chloride are stirred in 300 parts of dimethylformamide at 80° C. for 15 hours. Without isolation of the product of the formula

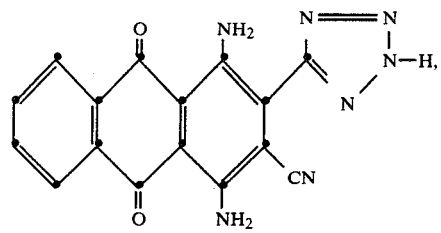

the reaction mixture is heated to 100° C., and 12 parts of sodium carbonate and 15 parts of dimethyl sulfate are added. The mixture is stirred for a further hour at 100° C.; it is then cooled, and diluted with 300 parts of water. A mixture of about 90 parts of the dye of the formula

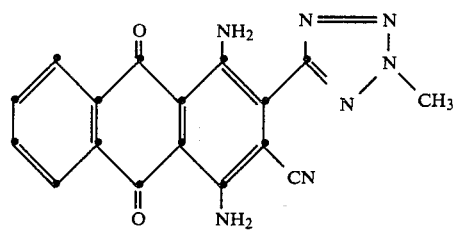

and about 10 parts of the dye of the formula

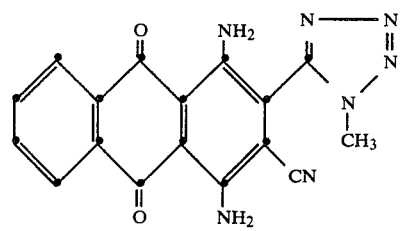

precipitates, and is isolated by filtration. The mixture can be used for dyeing polyester, on which are obtained clear blue dyeings having good fastness properties and a high degree of exhaustion.

When in the above Example the 15 parts of dimethyl sulfate are replaced by equivalent parts of an alkylating agent from Table 1, column 2, the reaction conditions being otherwise unchanged, there are obtained dye mixtures having equally good properties.

EXAMPLE 15

3.3 parts of the product of the formula

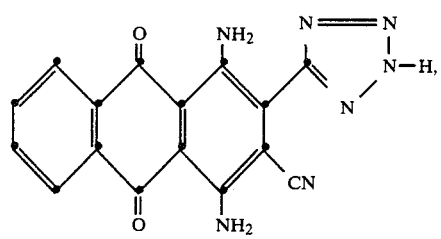

obtained according to Example 1, are dissolved in 30 parts of dimethylformamide at 80° C., and 1.1 parts of propylene oxide are added. The product of the formula

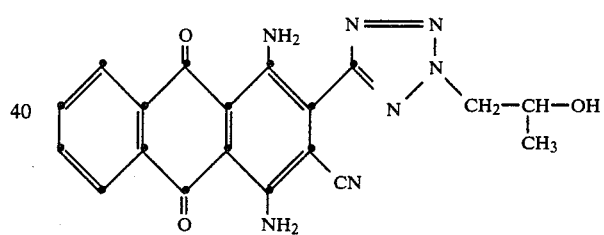

precipitates at room temperature. It is suitable for dyeing polyester in pure blue shades. A considerable increase in the substantivity of the above dye on polyester is achieved by acylating this dye, in a manner known per se, with acetic acid anhydride. The acetylated dye of the formula

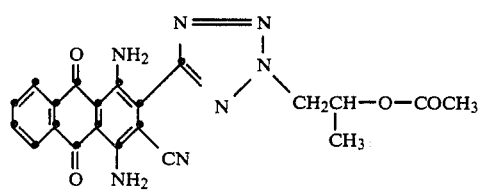

is absorbed, from its finely divided aqueous dispersion, onto polyester to give pure blue shades having excellent fastness to wet processing, rubbing and light.

Very similar blue dyeings are obtained with dyes which are obtained by replacing the propylene oxide with ethylene oxide or butylene oxide, or by replacing the acetic acid anhydride with propionic acid anhydride or with a mixture of the two anhydrides, and likewise when the acetic acid anhydride is replaced with chloroacetic acid anhydride or with chloroformic acid ethyl ester or chlorothioformic acid-S-ethyl ester, or with methanesulfochloride or with p-toluenesulfochloride.

Similar dyes are obtained when the two modification measures are combined.

EXAMPLE 16

When the procedure is carried out as described in Example 1 except that there is used, instead of 23 parts of 1,4-diamino-2,3-dicyanoanthraquinone, the equivalent amount of the respective cyano compounds listed in the following Table 2, column 2, there are obtained the tetrazole intermediates shown in column 3, which, in accordance with the process of Examples 1–15, are alkylated with the alkylating agents given in column 4 to obtain the dyes shown in column 5. In column 6 are given the respective shades on polyester (PES) material.

TABLE 2

| Ex. | Cyano compounds | Tetrazole intermediates | Alkylating agents | Dyes | Shade on PES |
|---|---|---|---|---|---|
| 17 | [structure] | [structure] | dimethyl sulfate | [structure] | green |
| 18 | " | " | diethyl sulfate | [structure] | green |
| 19 | [structure] | [structure] | dimethyl sulfate | [structure] | greenish-blue |
| 20 | [structure] | [structure] | diethyl sulfate | [structure] | greenish blue |

TABLE 2-continued

| Ex. | Cyano compounds | Tetrazole intermediates | Alkylating agents | Dyes | Shade on PES |
|---|---|---|---|---|---|
| 21 | (structure) | (structure) | dimethyl sulfate | (structure) | greenish blue |
| 22 | " | " | diethyl sulfate | (structure) | greenish blue |
| 23 | (structure) | (structure) | dimethyl sulfate | (structure) | green |
| 24 | " mixture 6/7 1:1 | " | diethyl sulfate | (structure) | green |

TABLE 2-continued

| Ex. | Cyano compounds | Tetrazole intermediates | Alkylating agents | Dyes | Shade on PES |
|---|---|---|---|---|---|
| 25 | (structure) | (structure) | dimethyl sulfate | (structure) | greenish blue |
| 26 | (structure) | (structure) | diethyl sulfate | (structure) | greenish blue |
| 27 | (structure) | (structure) | benzyl chloride | (structure) | greenish blue |
| 28 | (structure) | (structure) | dimethyl sulfate | (structure) | greenish blue |
| 29 | (structure) | (structure) | diethyl sulfate | (structure) | greenish blue |

TABLE 2-continued

| Ex. | Cyano compounds | Tetrazole intermediates | Alkylating agents | Dyes | Shade on PES |
|---|---|---|---|---|---|
| 30 | | | dimethyl sulfate | | greenish blue |
| 31 | | | dimethyl sulfate | | blue |
| 32 | | | diethyl sulfate | | blue |
| 33 | " | " | n-butyl chloride | | blue |
| 34 | | | benzyl chloride | | blue |

TABLE 2-continued

| Ex. | Cyano compounds | Tetrazole intermediates | Alkylating agents | Dyes | Shade on PES |
|---|---|---|---|---|---|
| 35 | (structure) | (structure) | dimethyl sulfate | (structure) | blue |
| 36 | (structure) | (structure) | dimethyl sulfate diethyl sulfate 50:50 | (structure) CH₃ 50% / C₂H₅ 50% | blue |
| 37 | " | " | dimethyl sulfate n-butyl chloride 50:50 | (structure) CH₃ 50% / (CH₂)₃CH₃ 50% | blue |
| 38 | (structure) | (structure) | dimethyl sulfate benzyl chloride 50:50 | (structure) CH₃ 50% / C₆H₅CH₂ 50% | blue |
| 39 | " | " | diethyl sulfate n-butyl chloride 50:50 | (structure) C₂H₅ 50% / CH₂CH₂CH₂CH₃ 50% | blue |

TABLE 2-continued

| Ex. | Cyano compounds | Tetrazole intermediates | Alkylating agents | Dyes | Shade on PES |
|---|---|---|---|---|---|
| 40 | " | " | diethyl sulfate / benzyl chloride 50:50 | (anthraquinone with NH₂, N=N-N(C₂H₅)/(CH₂-C₆H₅) 50%/50%, NH-C₂H₅) | blue |
| 41 | " | " | n-butyl chloride / benzyl chloride 50:50 | (anthraquinone with NH₂, N=N-N(CH₂CH₂CH₂CH₃)/(CH₂-C₆H₅) 50%/50%, NH-C₂H₅) | blue |
| 42 | (anthraquinone with NH₂, CN, NH-C₆H₅) | (anthraquinone with NH₂, tetrazole-NH, NH-C₆H₅) | diethyl sulfate | (anthraquinone with NH₂, N=N-N-C₂H₅, NH-C₆H₅) | blue |
| 43 | (anthraquinone with NH₂, CN, NH-2,4,6-trimethylphenyl) | (anthraquinone with NH₂, tetrazole-NH, NH-2,4,6-trimethylphenyl) | diethyl sulfate | (anthraquinone with NH₂, N=N-N-CH₃, NH-2,4,6-trimethylphenyl) | blue |
| 44 | (anthraquinone with NH₂, CN, NH-2,4,6-trimethylphenyl) | (anthraquinone with NH₂, tetrazole-NH, NH-2,4,6-trimethylphenyl) | diethyl sulfate | (anthraquinone with NH₂, N=N-N-C₂H₅, NH-2,4,6-trimethylphenyl) | blue |

EXAMPLE 45

12.5 parts of 1-amino-4-anilinoanthraquinone-2-sulfonic acid (Na salt), 4.8 parts of ammonium bicarbonate and 7.4 parts of sodium cyanide are stirred in 80 parts of dimethyl sulfoxide at 100° C. for 15 hours. The reaction mixture is diluted with 160 parts of water, and is stirred at room temperature for a further 4 hours (about 20° C.) to effect re-oxidation. The precipitated product of the formula

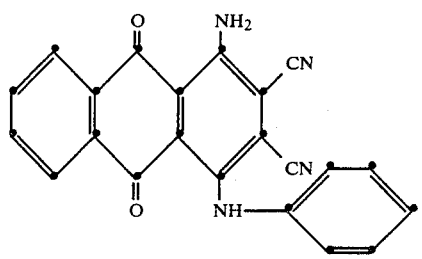

is filtered off with suction, washed with warm water and dried; yield 10.5 parts. The product thus obtained contains no 1-amino-2-cyano-4-anilino-anthraquinone.

EXAMPLE 46

The procedure is carried out as described in Example 45 except that there is used, in place of 12.5 parts of 1-amino-4-anilino-anthraquinone-2-sulfonic acid (Na salt), the equivalent amount of the compounds given in Table 3. In each case is obtained the corresponding 2,3-dicyano compound.

TABLE 3

| Ex. | |
|---|---|
| 47 | 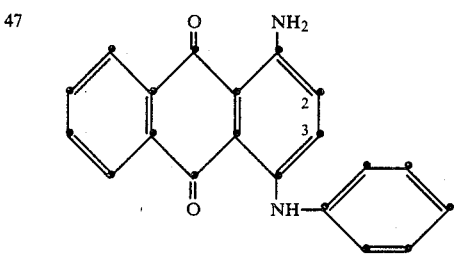 |
| 48 | 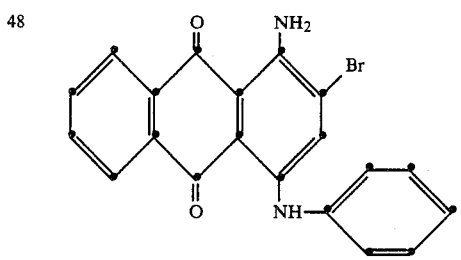 |

TABLE 3-continued

| Ex. | |
|---|---|
| 49 | (1-amino-4-anilino, 3-phenoxy anthraquinone) |
| 50 | (1-amino-4-anilino-3-cyano anthraquinone) |
| 51 | (1-amino-4-anilino-3-carboxy anthraquinone) |
| 52 | (1-amino-4-anilino-3-CO₂CH₃ anthraquinone) |
| 53 | (1-amino-4-anilino-2-CO₂CH₃-3-CN anthraquinone) |

EXAMPLE 54

By replacing in Example 45 the 12.5 parts of 1-amino-4-anilino-anthraquinone-2-sulfonic acid (Na salt) with equivalent parts of the respective compounds in Table 4, column 2, there are obtained, under otherwise the same reaction conditions, the corresponding 2,3-dicyanoanthraquinones listed in column 3.

TABLE 4
| Ex. | 2 | 3 |
|---|---|---|
| 55 | 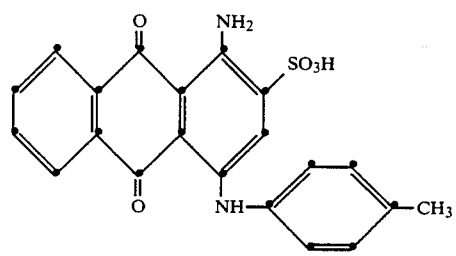 | 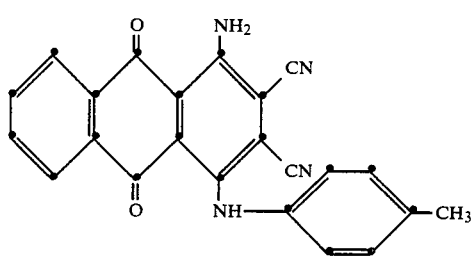 |
| 56 | 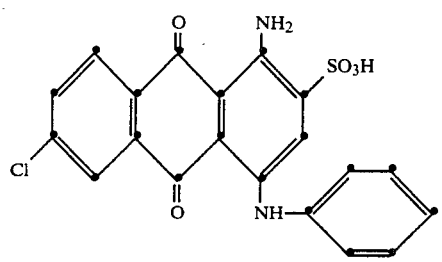 | 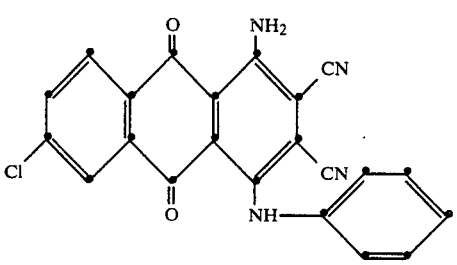 |
| 57 | 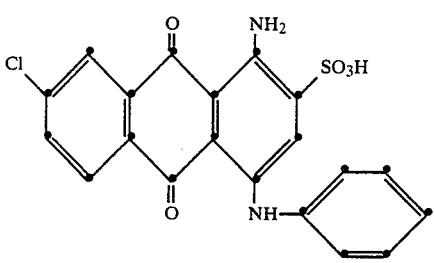 | 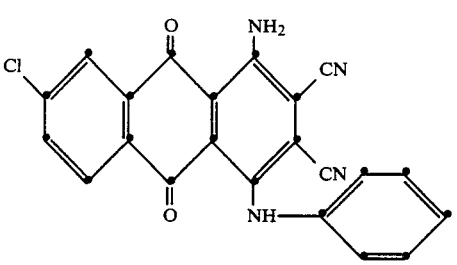 |
| 58 | 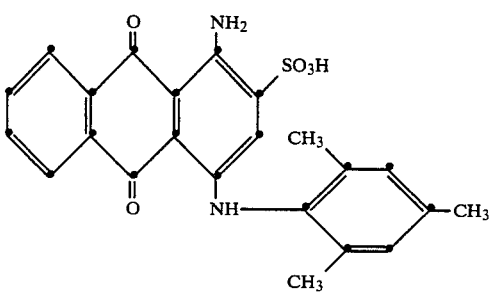 | 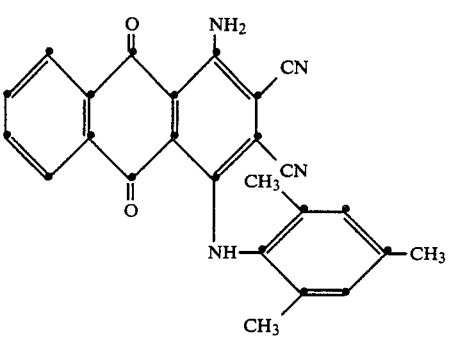 |
| 59 | 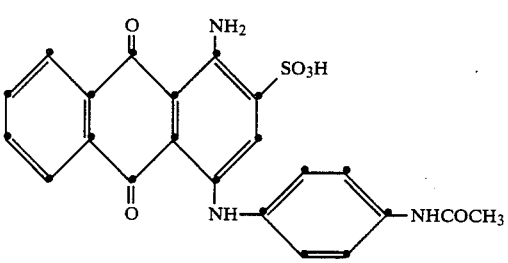 | 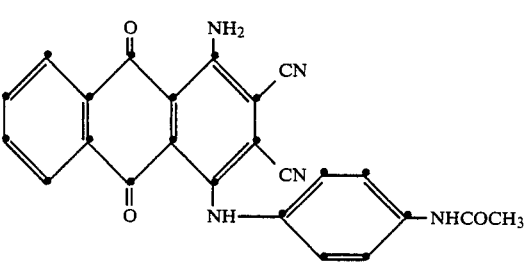 |

TABLE 4-continued
| Ex. | 2 | 3 |
|---|---|---|
| 60 | 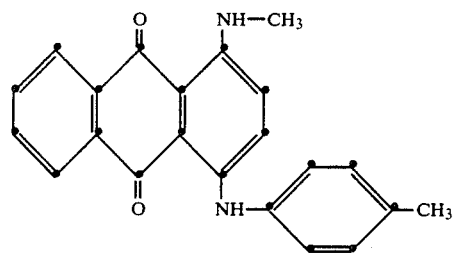 | 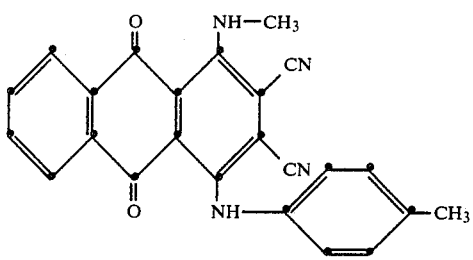 |
| 61 | 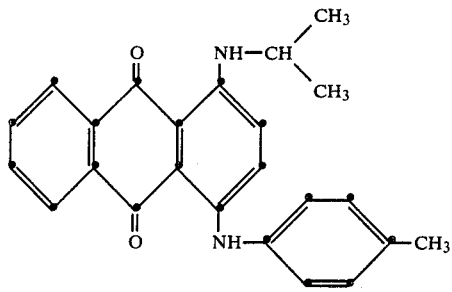 | 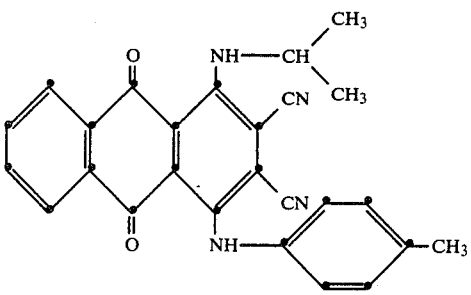 |
| 62 | 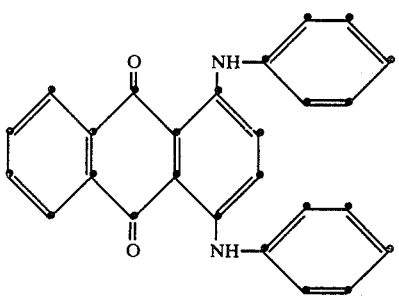 | 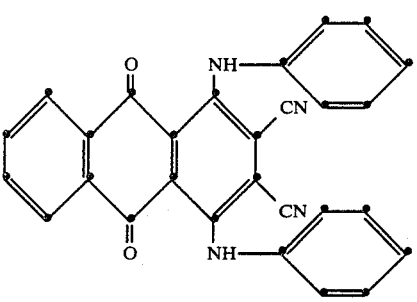 |
| 63 | 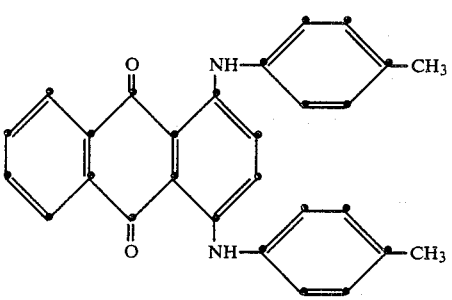 | 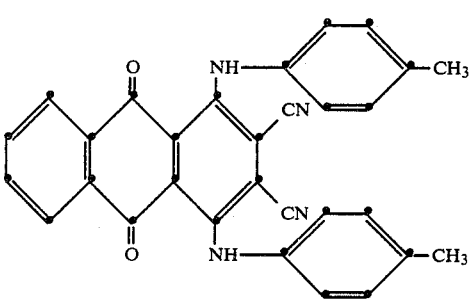 |
| 64 | 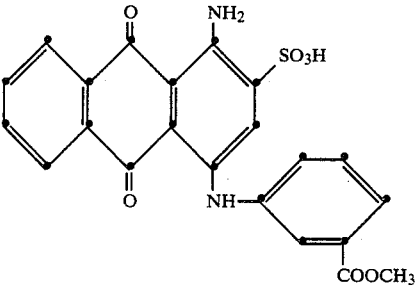 | 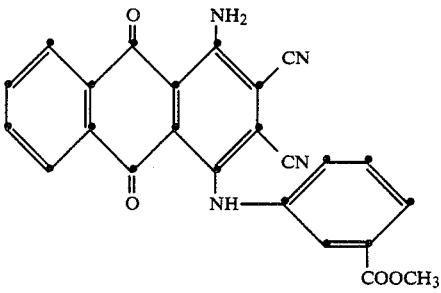 |

TABLE 4-continued

| Ex. | | |
|---|---|---|

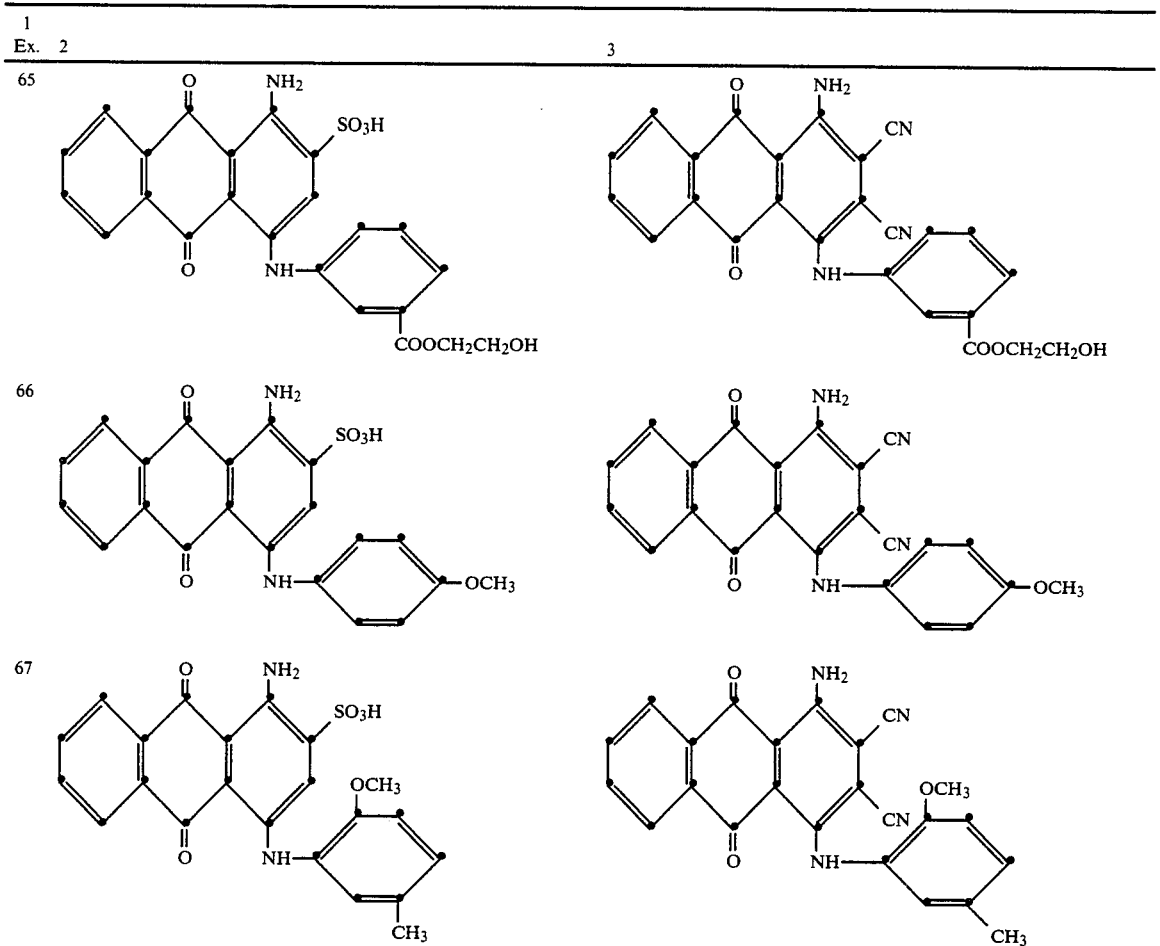

EXAMPLE 68

One part of the dry, additive-free dye according to Example 1 is mixed, in a glass-ball mill, together with 1 part of dinaphthylmethane disulfonate (Na salt) and water, and the mixture is ground until a particle size of about 2μ or smaller is attained. To the resulting paste, consisting of the dye, dispersing agent and water, are subsequently added 3 parts of sodium lignin sulfonate. The paste obtained is then subjected to spray drying, by which means a pulverulent dye preparation is obtained.

This dye preparation can be used to dye polyester materials, for example by the HT process, in the course of which the dye bath exhibits good dispersion stability. A blue polyester dyeing having good fastness to light is obtained.

EXAMPLE 69

Two parts of the dye obtained according to Example 1 are dispersed in 4000 parts of water. To this dispersion are added 12 parts of the sodium salt of o-phenylphenol and 12 parts of diammonium phosphate, and 100 parts of polyethylene glycol terephthalate yarn are dyed in this liquor at 95° to 98° C. for 90 minutes. The dyeing is then rinsed, and aftertreated with aqueous sodium hydroxide solution and a dispersing agent. A brilliant blue dyeing fast to light and to sublimation is thus obtained.

EXAMPLE 70

One part of the dye obtained according to Example 1 is wet ground with 2 parts of a 50% aqueous solution of the sodium salt of dinaphthylmethanedisulfonic acid, and the mixture is dried. This dye preparation is stirred up with 40 parts of a 10% aqueous solution of the sodium salt of N-benzylheptadecyl-benzimidazoledisulfonic acid, and 4 parts of a 40% acetic acid solution are added. The dye bath is made up to 4000 parts by dilution with water. Into this bath at 50° C. are introduced 100 parts of a polyester fibre material; the temperature is raised within half an hour to 120° to 130° C., and dyeing is performed at this temperature in a closed vessel. The material is subsequently well rinsed to thus obtain a brilliant blue dyeing having good fastness to light.

EXAMPLE 71

Polyethylene glycol terephthalate fabric is impregnated, on a padding machine, at 40° C. with a liquor of the following composition:
  20 parts of the dye obtained according to Example 1, finely dispersed in
  10 parts of sodium alginate,
  20 parts of triethanolamine,
  20 parts of octylphenol polyglycol ether, and
  930 parts of water.

The fabric, squeezed out to about 100%, is dried at 100° C., and subsequently fixed for 30 seconds at a temperature of 210° C. The dyed material is rinsed with water, soaped and dried. A brilliant blue dyeing having fastness to light is obtained.

What is claimed is:

1. A 1,4-diaminoanthraquinone compound of the formula

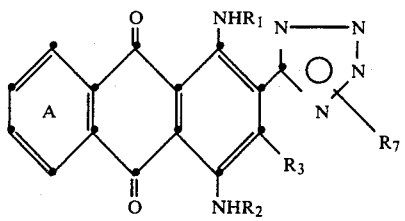

wherein $R_1$ and $R_2$ independently of one another are each hydrogen; $C_1$-$C_6$alkyl or $C_1$-$C_6$alkyl substituted by hydroxy, $C_1$-$C_4$alkoxy or hydroxy-$C_1$-$C_4$alkoxy; $C_5$-$C_8$cycloalkyl or $C_5$-$C_8$cycloalkyl substituted by $C_1$-$C_3$alkyl; or phenyl or phenyl substituted by $C_1$-$C_6$alkyl, $C_1$-$C_6$alkoxy, halogen, nitro, NHCO-$C_1$-$C_6$alkyl, —COO—$C_1$—$C_4$alkyl or —COO—$C_1$—$C_4$hydroxyalkyl; $R_3$ is hydrogen, cyano, or COOR$_4$ or CONR$_5$R$_6$, wherein $R_4$ is $C_1$-$C_{10}$alkyl or $C_1$-$C_{10}$alkyl substituted by hydroxy, phenoxy, alkoxy or hydroxyalkoxy or is $C_5$-$C_8$cycloalkyl, and $R_5$ and $R_6$ independently of one another are each hydrogen or $C_1$-$C_{10}$alkyl, $R_7$ is $C_1$-$C_{10}$alkyl or $C_1$-$C_{10}$alkyl substituted by hydroxy, $C_1$-$C_4$alkoxy, phenyl or phenyl substituted by $C_1$-$C_4$alkyl, halogen or nitro, phenyl-$C_1$-$C_3$alkoxy, phenyl-$C_1$-$C_3$alkylthio, phenoxy, lower alkanoyl, lower alkanoyloxy, —NR$_8$R$_9$ or —$\oplus$NR$_8$R$_9$R$_{10}$ An$^\ominus$ wherein $R_8$, $R_9$ and $R_{10}$ independently are $C_1$-$C_4$alkyl or phenyl-$C_1$-$C_4$alkyl and An$^\ominus$ is an anion, or COR$_{12}$ wherein $R_{12}$ is phenyl, $C_1$-$C_6$alkyl or $C_1$-$C_6$alkyl substituted by phenyl which is unsubstituted or substituted by $C_1$-$C_4$alkyl or halogen, and wherein the benzo radical A is not substituted or is substituted by halogen, hydroxy, $C_1$-$C_4$-alkoxy, hydroxy-$C_1$-$C_4$-alkoxy, phenoxy, $C_1$-$C_4$-alkylphenoxy, halophenoxy, nitro, amino, N-$C_1$-$C_4$-alkylamino, N,N-di-$C_1$-$C_4$-alkylamino, phenylamino, $C_1$-$C_4$-alkylphenylamino, $C_1$-$C_4$-alkoxyphenylamino or halophenylamino.

2. A 1,4-diaminoanthraquinone compound of claim 1, wherein $R_1$ and $R_2$ are each hydrogen.

3. A 1,4-diaminoanthraquinone compound of claim 1, wherein $R_3$ is the CN group.

4. A 1,4-diaminoanthraquinone compound of claim 1, wherein $R_7$ is either unsubstituted $C_1$-$C_4$-alkyl, or $C_1$-$C_4$-alkyl substituted by phenyl.

5. A 1,4-diaminoanthraquinone compound of claim 1, wherein the benzo radical A is not substituted.

6. A 1,4-diaminoanthraquinone compound of claim 1, wherein $R_1$ is hydrogen, $R_2$ is hydrogen, phenyl which is unsubstituted or substituted by $C_1$-$C_4$-alkyl, or it is $C_1$-$C_4$-alkyl, cyclohexyl or $C_2H_4OCH_3$, $R_3$ is hydrogen or CN, and $R_7$ is $C_1$-$C_4$-alkyl, benzyl or CH$_2$CH—CH$_3$—O—COCH$_3$ and wherein the benzo radical A is not substituted.

7. The 1,4-diaminoanthraquinone compound of claim 1, wherein $R_1$ and $R_2$ are hydrogen, $R_3$ is cyano, $R_7$ is n-butyl, and the benzo radical A is not substituted.

* * * * *